(12) United States Patent
Petrov et al.

(10) Patent No.: US 12,240,308 B2
(45) Date of Patent: Mar. 4, 2025

(54) AXLE ASSEMBLY FOR AN ELECTRIC VEHICLE, VEHICLE, AND METHOD FOR OPERATING AN AXLE ASSEMBLY

(71) Applicant: Volvo Car Corporation, Gothenburg (SE)

(72) Inventors: Peter Petrov, Gothenburg (SE); Håkan Lennström, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 18/526,185

(22) Filed: Dec. 1, 2023

(65) Prior Publication Data

US 2024/0181859 A1    Jun. 6, 2024

(30) Foreign Application Priority Data

Dec. 1, 2022 (EP) ..................................... 22210775

(51) Int. Cl.
*B60K 1/02* (2006.01)
*B60K 17/16* (2006.01)

(52) U.S. Cl.
CPC ................ *B60K 1/02* (2013.01); *B60K 17/16* (2013.01)

(58) Field of Classification Search
CPC .................................. B60K 1/02; B60K 17/16
See application file for complete search history.

(56) References Cited

U.S. PATENT DOCUMENTS

| 5,289,890 | A * | 3/1994 | Toyoda | .................. B60L 50/61 |
| | | | | 318/432 |
| 9,199,526 | B2 * | 12/2015 | Hasuda | ................. B60W 10/08 |
| 2014/0284130 | A1 * | 9/2014 | Knoblauch | ......... B60L 15/2036 |
| | | | | 180/242 |

(Continued)

FOREIGN PATENT DOCUMENTS

| DE | 102011056928 A1 | 6/2013 |
| DE | 102018210897 A1 | 1/2020 |

(Continued)

OTHER PUBLICATIONS

Definition of common (Year: 2020).*
Extended European Search Report received for European Application Ser. No. 22210775.7 dated Jun. 5, 2023, 8 pages.

*Primary Examiner* — Jacob S. Scott
*Assistant Examiner* — Farhana Pervin
(74) *Attorney, Agent, or Firm* — Amin, Turocy & Watson, LLP

(57) ABSTRACT

The disclosure relates to an axle assembly for an electric vehicle. The axle assembly comprises a first electric machine, a second electric machine, and a spur gear unit comprising at least one spur gear stage and a differential gear unit. The at least one spur gear stage is drivingly coupled to the differential gear unit. Moreover, an output shaft of the first electric machine, an output shaft of the second electric machine, and an input shaft of the spur gear stage are formed by a common shaft. Additionally, the differential gear unit comprises a first output flange for drivingly coupling a first wheel to the axle assembly and a second output flange for drivingly coupling a second wheel to the axle assembly. Furthermore, a vehicle comprising such an axle assembly is presented. The differential gear unit is arranged centrally with respect to a vehicle width direction.

20 Claims, 2 Drawing Sheets

(56) References Cited

U.S. PATENT DOCUMENTS

| | | | |
|---|---|---|---|
| 2014/0335999 A1* | 11/2014 | Knoblauch | B60K 17/165 477/5 |
| 2015/0021109 A1* | 1/2015 | Knoblauch | B60K 17/12 475/150 |
| 2019/0077247 A1* | 3/2019 | Schwekutsch | B60K 17/34 |
| 2019/0195186 A1* | 6/2019 | O'Brien | B60W 10/08 |
| 2020/0247226 A1* | 8/2020 | Meyer | B60K 1/00 |
| 2021/0016766 A1* | 1/2021 | Lehmann | B60K 6/48 |
| 2021/0114448 A1* | 4/2021 | Meyer | H02K 5/1732 |
| 2022/0290749 A1 | 9/2022 | Mizutani et al. | |
| 2023/0356581 A1* | 11/2023 | Cattoor | B60K 17/16 |

FOREIGN PATENT DOCUMENTS

| | | | |
|---|---|---|---|
| DE | 102019103131 A1 * | 8/2020 | |
| FR | 3089886 A1 | 6/2020 | |

\* cited by examiner

AXLE ASSEMBLY FOR AN ELECTRIC VEHICLE, VEHICLE, AND METHOD FOR OPERATING AN AXLE ASSEMBLY

CROSS-REFERENCE TO RELATED APPLICATIONS

This application claims the benefit of and priority to pending EP patent application serial number 22210775.7, filed Dec. 1, 2022, and entitled "AXLE ASSEMBLY FOR AN ELECTRIC VEHICLE, VEHICLE, AND METHOD FOR OPERATING AN AXLE ASSEMBLY," the entirety of which is hereby incorporated by reference herein.

TECHNICAL FIELD

The present disclosure relates to an axle assembly for an electric vehicle.

BACKGROUND

Existing axle assemblies for electric vehicles usually comprise at least one electric machine and at least one transmission unit such that a drive power being generated by the electric machine can be provided to the driven wheels of the vehicle.

SUMMARY

It is an objective of the present disclosure to increase the efficiency of such axle assemblies.

The present disclosure relates to an axle assembly for an electric vehicle.

The present disclosure is further directed to a vehicle comprising such an axle assembly.

Moreover, the present disclosure is directed to a method for operating such an axle assembly.

The problem is at least partially solved or alleviated by the subject matter of the independent claims of the present disclosure, wherein further examples are incorporated in the dependent claims.

According to a first aspect, there is provided an axle assembly for an electric vehicle. The axle assembly comprises a first electric machine, a second electric machine, and a spur gear unit comprising at least one spur gear stage and a differential gear unit. The at least one spur gear stage is drivingly coupled to the differential gear unit. Moreover, an output shaft of the first electric machine, an output shaft of the second electric machine, and an input shaft of the spur gear stage are formed by a common shaft. The differential gear unit comprises a first output flange for drivingly coupling a first wheel to the axle assembly and a second output flange for drivingly coupling a second wheel to the axle assembly. Thus, a drive power being generated by the first electric machine and/or the second electric machine can be transferred to the first output flange and the second output flange via the spur gear stage and the differential gear unit. In this context, the spur gear stage is to be understood as a non-shiftable spur gear stage. This means that the spur gear stage can provide a single gear only. Since the input shaft of the spur gear stage is formed as a common shaft, it may be designated as a common input shaft. The common shaft is connected to both the first electric machine and the second electric machine. Moreover, since the spur gear unit is drivingly coupled to both the first electric machine and the second electric machine, it may be designated as a common spur gear unit. In an example, both the rotor of the first electric machine and the rotor of the second electric machine may be arranged on the common shaft. Consequently, the common shaft may be realized as one unitary continuous part. Thus, the common shaft and the subassembly comprising the common shaft, the first electric machine and the second electric machine may be realized in a compact manner. This offers the possibility to support the common shaft with relatively few bearings. This has the effect that friction occurring in bearings is avoided. In other words, the efficiency of the axle assembly is increased. A further advantage lies in the fact that two electric machines, i.e., the first electric machine and the second electric machine are used. This improves the packaging of the axle assembly. Additionally, the first electric machine and the second electric machine may be electromagnetically optimized on different operational points or operational ranges. This has the effect that the axle assembly can be operated with high electromagnetic efficiency over a broad range of driving conditions. Altogether, the axle assembly of the present disclosure is highly efficient in a mechanical sense and in and electromagnetic sense.

In an example, the spur gear unit only comprises one or more spur gear stages and one differential gear unit. In other words, the spur gear unit may consist of one or more spur gear stages and one differential gear unit. Thus, the spur gear unit may not comprise gear stages of other types such as planetary gear stages.

In another example, the differential gear unit comprises a ring gear and a bevel gear unit having four bevel years being rotatorily supported on a bevel gear cage. The bevel gear cage is connected to the ring gear. This is a known configuration of a differential gear unit.

In an example, a singular pinion is arranged on the common shaft. First of all, this is structurally simple. Since the singular pinion is arranged on the common shaft which is realized as both the output shaft of the first electric machine and the output shaft of the second electric machine, the singular pinion may be rotated by each of the first electric machine and the second electric machine alone or by both the first electric machine and the second electric machine together. Consequently, a broad range of operational modes is possible for such an axle assembly.

In an example, the common shaft is supported on exactly two bearing units. More precisely, the common shaft is supported by the exactly two bearing units in a housing of the axle assembly or on a frame of the axle assembly. Especially when considering known axle assemblies, exactly two bearing units are relatively few bearing units. Since every bearing unit produces mechanical losses due to internal friction in the bearing unit, using fewer bearing units leads to an enhanced mechanical efficiency.

In an example, the differential gear unit is supported on exactly two bearing units. More precisely, the differential gear unit is supported by the exactly two bearing units in a housing of the axle assembly or on a frame of the axle assembly. Especially when considering known axle assemblies, exactly two bearing units are relatively few bearing units. Since every bearing unit produces mechanical losses due to internal friction in the bearing unit, using fewer bearing units leads to an enhanced mechanical efficiency.

In an example, the at least one spur gear stage comprises an intermediate shaft being arranged parallel to the common shaft. It is understood that the intermediate shaft and the common shaft are offset with respect to one another. Using an intermediate shaft allows the spur gear stage to provide a gear ratio of relatively big magnitude.

In an example, the intermediate shaft is supported on exactly two bearing units. More precisely, the intermediate shaft is supported by the exactly two bearing units in a housing of the axle assembly or on a frame of the axle assembly. Especially when considering known axle assemblies, exactly two bearing units are relatively few bearing units. Since every bearing unit produces mechanical losses due to internal friction in the bearing unit, using fewer bearing units leads to an enhanced mechanical efficiency.

In an example, the differential gear unit is rotatable around an axis of rotation which is arranged parallel to the common shaft. Again, the axis of rotation and the common shaft are offset with respect to one another. Such a configuration is structurally simple and reliable in operation.

In an example, the first electric machine and the second electric machine are of the same type and/or have the same performance. In this context, the type of the first electric machine and the second electric machine relates to the working principle of the first electric machine and the second electric machine. The performance of the first electric machine and the second electric machine describes the capability of the first electric machine and the second electric machine to provide driving power. If the first electric machine and the second electric machine are of the same type and/or have the same performance, the first electric machine and the second electric machine may be identical at least in one of these respects. This renders the structure of the axle assembly simple. At the same time, the first electric machine and the second electric machine may be sourced using a same part strategy. This may reduce the costs of the axle assembly. A further advantage of this configuration lies in the fact that the first electric machine and the second electric machine may use a common or shared inverter unit.

In an example, the first electric machine and the second electric machine differ in the respective type and/or the respective performance. This means that the first electric machine and the second electric machine use a different operational principle. Additionally, or alternatively, the capabilities of the first electric machine and the second electric machine to provide driving power are different. This offers the possibility to have the first electric machine and the second electric machine optimized to different operational points or operational ranges. It is understood that electromagnetic losses of the first electric machine and the second electric machine are minimal in the respective operational point or range to which the first electric machine or the second electric machine is optimized. In an example, one of the first electric machine and the second electric machine may be optimized to an operational point which corresponds to a very common driving situation. The other one of the first electric machine and the second electric machine may be optimized to driving situations requiring high driving power. Consequently, in both of these driving situations, only a reduced amount of electromagnetic losses is produced. In other words, the axle assembly is highly efficient from the electromagnetic perspective. In such a configuration, one of the first electric machine and the second electric machine may be called a main electric machine and the other one may be called an auxiliary electric machine.

In an example, at least one of the first electric machine and the second electric machine is of a type that does not cause electromagnetic losses while rotating passively. This further increases the electromagnetic efficiency of the axle assembly.

In an example, one out of the first electric machine and the second electric machine is an induction machine, a synchronous reluctance machine, a permanent magnet-assisted synchronous reluctance machine, a switched reluctance machine or an electrically excited rotor synchronous machine. Alternatively, or additionally, the respective other one of the first electric machine and the second electric machine is a permanent magnet synchronous machine, an induction machine, a synchronous reluctance machine, a permanent magnet-assisted synchronous reluctance machine, a switched reluctance machine, an electrically excited rotor synchronous machine, a transverse flux machine or a variable flux machine. An induction machine, a synchronous reluctance machine, a permanent magnet-assisted synchronous reluctance machine, a switched reluctance machine and an electrically excited rotor synchronous machine all have the advantage that they do not produce electromagnetic losses when being turned passively. Thus, such electric machines are particularly suitable for being used as an auxiliary electric machine as has been described above. Altogether, the axle assembly is very efficient from an electromagnetic perspective.

In an example, at least one of the first electric machine and the second electric machine comprises an external rotor. In an example, both the first electric machine and the second electric machine comprise an external rotor. Electric machines having an external rotor are comparatively short in an axial direction of the output shaft. This means that a corresponding dimension of the axle assembly is comparatively small. Moreover, in such a configuration the first electric machine and/or the second electric machine only creates a relatively small overhang on the common shaft. This leads to a situation in which only comparatively few bearings are necessary in order to support the common shaft. Thus, the common shaft may be supported in a mechanically efficient manner.

In an example, the axle assembly further comprises an inverter unit, wherein the inverter unit is at least partially arranged between the first electric machine and the second electric machine. Consequently, the axle assembly is relatively compact. Furthermore, as has already been explained above, depending on the configuration of the first electric machine and the second electric machine, the inverter unit may be a common or shared in inverter unit of both the first electric machine and the second electric machine.

In an example, the inverter unit may be arranged in a pocket between the first electric machine and the second electric machine.

In a further example, the inverter unit may be arranged adjacent to the spur gear unit.

It is noted that the above-mentioned examples may also be combined such that the inverter unit is arranged both in a pocket between the first electric machine and the second electric machine and adjacent to the spur gear unit. This is a particularly compact configuration.

In an example, the axle assembly further comprises a first axle shaft being drivingly connected to the first output flange and a second axle shaft being drivingly connected to the second output flange. The first axle shaft and the second axle shaft have the same length. An end of each of the axle shafts being arranged opposite to the end being connected to the respective first output flange or second output flange is configured to be coupled to a wheel. Having a first axle shaft and a second axle shaft of the same length renders the axle assembly structurally simple. Furthermore, torque steering effects are avoided. Moreover, such an axle assembly is balanced along a direction which corresponds to a direction of extension of the axle shafts. This direction may correspond to a transverse direction of a vehicle which uses the axle assembly.

According to a second aspect, there is provided a vehicle comprising an axle assembly of the present disclosure. The differential gear unit is arranged centrally with respect to a vehicle width direction. In this context, the width direction of the vehicle extends perpendicular to a standard forward traveling direction of the vehicle. Arranging the differential gear unit centrally with respect to the width direction has the effect that the vehicle is balanced with respect to its width direction. At the same time, axle shafts of the same length may be used and, thus, the advantages which have already been described above may be achieved. Moreover, such a configuration makes it possible not to use additional bearings for the axle shafts. This enhances the mechanical efficiency of the axle assembly and of the vehicle as a whole.

According to a third aspect, there is provided a method for operating an axle assembly of the present disclosure. The method comprises:

operating only one out of the first electric machine and the second electric machine in a first driving mode, and operating both the first electric machine and the second electric machine in a second driving mode.

In this context, the one out of the first electric machine at a second electric machine which is operated in the first driving mode may be optimized to an operational point or operational range which corresponds to this first driving mode. The first driving mode may be a partial load mode. Consequently, the first driving mode is highly efficient, especially from an electromagnetic perspective. In the second driving mode both electric machines are used. In this context, the one out of the first electric machine and the second electric machine which is only used in the second driving mode may be optimized to an operational point or an operational range which optimizes the efficiency of the second driving mode. The second driving mode may be a high load mode or a full load mode. It is understood that the one out of the first electric machine and the second electric machine that is used in both the first driving mode and the second driving mode still is optimized for an operational point or operational range which corresponds to the first driving mode. Thus, also the second driving mode is highly efficient at least from an electromagnetic perspective.

It should be noted that the above examples may be combined with each other irrespective of the aspect involved.

These and other aspects of the present disclosure will become apparent from and elucidated with reference to the examples described hereinafter.

BRIEF DESCRIPTION OF DRAWINGS

Examples of the disclosure will be described in the following with reference to the following drawings.

DETAILED DESCRIPTION

The Figures are merely schematic representations and serve only to illustrate examples of the disclosure. Identical or equivalent elements are in principle provided with the same reference signs.

Figure 1:
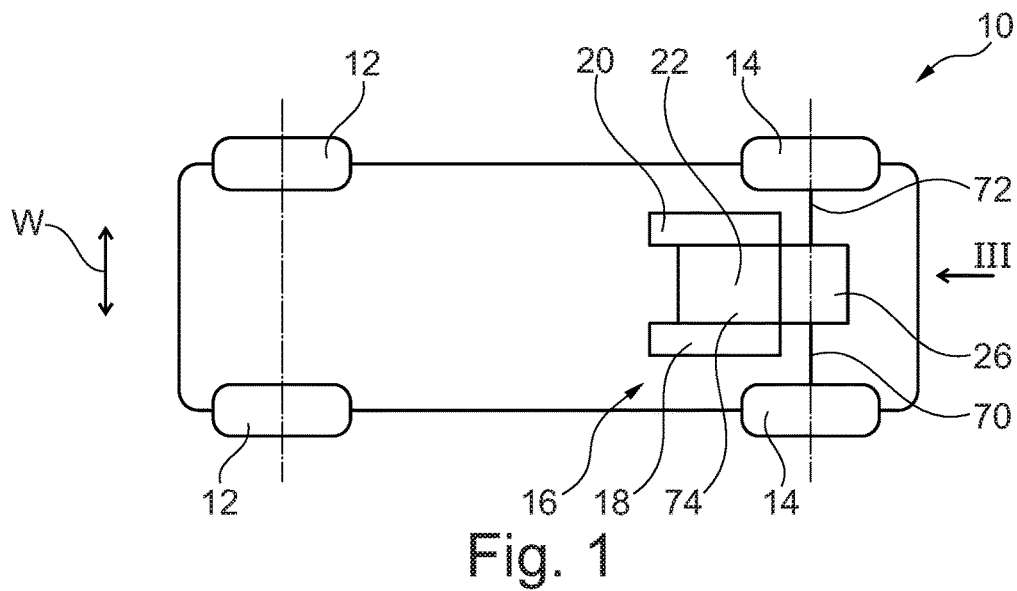
FIG. 1 shows a vehicle according to the present disclosure having an axle assembly according to the present disclosure which may be operated using a method for operating an axle assembly according to the present disclosure.

FIG. 1 shows a vehicle 10 which is an electric vehicle in the present example.

The vehicle 10 comprises a pair of front wheels 12 and a pair of rear wheels 14.

The rear wheels 14 are driven wheels. The left rear wheel 14 may be called a first wheel and the right rear wheel may be called a second wheel 14.

To this end, an axle assembly 16 is provided.

The axle assembly 16 comprises a first electric machine 18 and a second electric machine 20.

Moreover, the axle assembly 16 comprises a spur gear unit 22 having a spur gear stage 24 and a differential gear unit 26.

Figure 2:
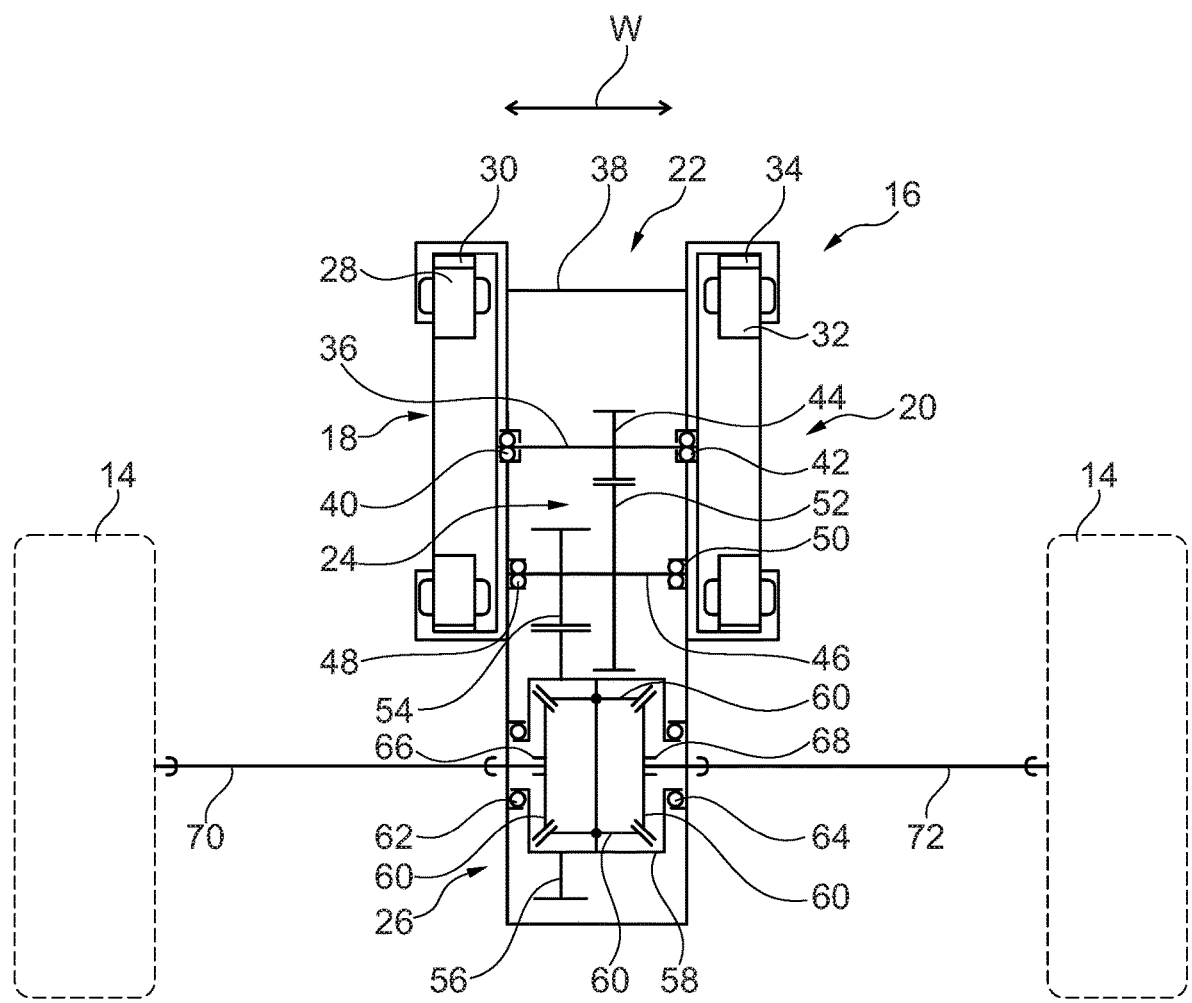
FIG. 2 shows the axle assembly of FIG. 1 in a more detailed view.

The axle assembly 16 is shown in more detail in FIG. 2.

As can be seen therefrom, the first electric machine 18 comprises an internal stator 28 and an external rotor 30.

Also, the second electric machine 20 comprises an internal stator 32 and an external rotor 34.

In the example shown in the Figures, the first electric machine 18 and the second electric machine are of the same type.

An output shaft of the first electric machine 18 and an output shaft of the second electric machine 20 are formed by a common shaft 36.

At the same time, the common shaft 36 is an input shaft of the spur gear stage 24.

The common shaft 36 is supported on a housing 38 of the axle assembly 16 via exactly two bearing units 40, 42.

Moreover, a singular pinion 44 is arranged on the common shaft 36. The singular pinion 44 is rotationally fixed on the common shaft 36.

The spur gear stage 24 additionally comprises an intermediate shaft 46.

The intermediate shaft 46 is arranged in parallel to the common shaft 36.

The intermediate shaft 46 and the common shaft 36 are offset from one another.

Also, the intermediate shaft is rotatorily supported on the housing 38 via exactly two bearing units 48, 50.

A first gear 52 and a second gear 54 are rotationally fixed on the intermediate shaft 46.

The first gear 52 engages the singular pinion 44.

Thus, the first gear 52 and the singular pinion 44 form the spur gear stage 24.

The spur gear stage 24 is coupled to the differential gear unit 26 via the second gear 54. In other words, the spur gear stage 24 is drivingly connected to the differential unit 26.

To this end, the second gear 54 engages a ring gear 56 of the differential gear unit 26.

It is noted that in the present example the second gear 54 engaging the ring gear 56 is seen as a connection between the spur gear stage 24 and the differential gear unit 26 rather than a second spur gear stage.

In the present example, the ring gear 56 is fixed on a cage 58 of the differential gear unit 26. Moreover, inside the cage 58, a total of four bevel gears 60 are provided.

Since the differential gear unit 26 structurally corresponds to a generally known differential gear units, a detailed description of the interaction of the cage 58, the four bevel gears 60 and the ring gear 56 is omitted here.

The cage 58, or more generally speaking the differential gear unit 26 is rotatably supported on the housing 38 by exactly two bearing units 62, 64.

Thus, an axis of rotation of the differential gear unit 26 is parallel to the common shaft 36.

Moreover, the differential gear unit 26 comprises a first output flange 66 being provided on the bevel gear 60 shown on the left side in FIG. 2, and a second output flange 68 being provided on the bevel gear 60 shown on the right side in FIG. 2.

A first axle shaft 70 is drivingly connected to the first output flange 66 and a second axle shaft 72 is drivingly connected to the second output flange 68.

Each of the rear wheels 14 may be coupled to an end of the corresponding first axle shaft 70 or second axle shaft 72 which is remote from the differential gear unit 26. More precisely the first or left rear wheel 14 is connected to the first axle shaft 70 and the second or right rear wheel 14 is connected to the second axle shaft 72. Since the rear wheels 14 do not form part of the axle assembly 16, they are represented in dotted lines in FIG. 2.

Both the first axle shaft 70 and the second axle shaft 72 have the same length.

Moreover, the differential gear unit 26 is arranged centrally with respect to a vehicle width direction W.

The axle assembly 16 also comprises an inverter unit 74.

Since in the present example, the first electric machine 18 and the second electric machine 20 are of the same type, the inverter unit 74 is a common or shared inverter unit 74. This means that the inverter unit 74 is used for powering both the first electric machine 18 and the second electric machine 20.

Figure 3:
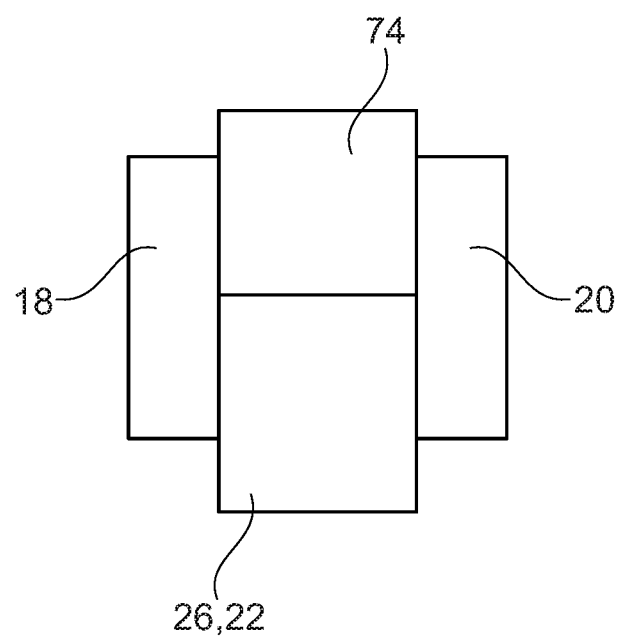
FIG. 3 shows a further detailed view of the axle assembly of FIG. 1 along direction III in FIG. 1.

As can best be seen in FIG. 3, the inverter unit 74 is partially arranged between the first electric machine 18 and the second electric machine 20.

Moreover, the inverter unit is arranged on top of the spur gear unit 22 and the differential gear unit 26.

The axle assembly 16 may be operated using a method for operating an axle assembly.

According to this method, only one out of the first electric machine 18 and the second electric machine 20 is operated in a first driving mode. The first driving mode may be a low load mode.

The first driving mode may be configured to be used in a standard driving situation. In the present example, only the first electric machine 18 may be used in such a situation, i.e., in the first driving mode.

Alternatively, a second driving mode may be used. In this second driving mode, both the first electric machine 18 and the second electric machine 20 may be operated. The second drivingly mode may be configured to be used in situations where high driving power is needed, for example if a strong acceleration is requested or if the vehicle 10 is driving up a steep hill. The second driving mode may be a high load mode.

In another example, the first electric machine 18 and the second electric machine 20 may be of different types. In this context, the first electric machine may be a permanent magnet synchronous machine. The second electric machine may be an induction machine or a synchronous reluctance machine.

Induction machines and synchronous reluctance machines have the advantage that they can be rotated passively without generating electromagnetic losses.

Also, the axle assembly 16 according to this example may be operated using the method for operating an axle assembly as has been described above.

Other variations to the disclosed examples can be understood and effected by those skilled in the art in practicing the claimed disclosure, from the study of the drawings, the disclosure, and the appended claims. In the claims the word "comprising" does not exclude other elements or steps and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the claims.

LIST OF REFERENCE SIGNS 10 vehicle
12 front wheel
14 rear wheel
16 axle assembly
18 first electric machine
20 second electric machine
22 spur gear unit
24 spur gear stage
26 differential gear unit
28 internal stator of the first electric machine
30 external rotor of the first electric machine
32 internal stator of the second electric machine
34 external rotor of the second electric machine
36 common shaft
38 housing
40 bearing unit
42 bearing unit
44 singular pinion
46 intermediate shaft
48 bearing unit
50 bearing unit
52 first gear
54 second gear
56 ring gear
58 cage
60 bevel gear
62 bearing unit
64 bearing unit
66 first output flange
68 second output flange
70 first axle shaft
72 second axle shaft
74 inverter unit
W vehicle width direction

What is claimed is:

1. An axle assembly for an electric vehicle, comprising:
a first electric machine configured to minimize electromagnetic losses of the first electric machine in a first operational range;
a second electric machine configured to minimize electromagnetic losses of the second electric machine in a second operational range, wherein the second operational range is different from the first operational range;
a shaft comprising a singular pinion rotationally fixed to the shaft between a first end of the shaft and a second end of the shaft opposite the first end, wherein the first electric machine is coupled to the first end of the shaft, and the second electric machine is coupled to the second end of the shaft, and wherein the shaft is supported on exactly two bearing units; and
a spur gear unit comprising at least one spur gear stage and a differential gear unit, the at least one spur gear stage being drivingly coupled to the differential gear unit,
wherein the singular pinion engages with a gear of the spur gear unit, and
wherein the differential gear unit comprises a first output flange for drivingly coupling a first wheel to the axle assembly and a second output flange for drivingly coupling a second wheel to the axle assembly.

2. The axle assembly of claim 1, wherein the differential gear unit is supported on exactly two bearing units.

3. The axle assembly of claim 1, wherein the at least one spur gear stage comprises an intermediate shaft being arranged parallel to the shaft.

4. The axle assembly of claim 3, wherein the intermediate shaft is supported on exactly two bearing units.

5. The axle assembly of claim 1, wherein the differential gear unit is rotatable around an axis of rotation being arranged parallel to the shaft.

6. The axle assembly of claim 1, wherein the first electric machine and the second electric machine are of a same type of machine.

7. The axle assembly of claim 1, wherein the first electric machine and the second electric machine are different types of machines.

8. The axle assembly of claim 7, wherein one out of the first electric machine or the second electric machine is an induction machine, a synchronous reluctance machine, a permanent magnet-assisted synchronous reluctance machine, a switched reluctance machine, or an electrically excited rotor synchronous machine, and
wherein a respective other one of the first electric machine or the second electric machine is a permanent magnet synchronous machine, an induction machine, a synchronous reluctance machine, a permanent magnet-assisted synchronous reluctance machine, a switched reluctance machine, an electrically excited rotor synchronous machine, a transverse flux machine, or a variable flux machine.

9. The axle assembly of claim 1, wherein at least one of the first electric machine or the second electric machine comprises an external rotor.

10. The axle assembly of claim 1, further comprising:
an inverter unit, wherein the inverter unit is at least partially arranged between the first electric machine and the second electric machine.

11. The axle assembly of claim 1, further comprising:
a first axle shaft being drivingly connected to the first output flange; and
a second axle shaft being drivingly connected to the second output flange,
wherein the first axle shaft and the second axle shaft have a same length.

12. A vehicle, comprising:
an axle assembly, comprising:
a first electric machine configured to minimize electromagnetic losses of the first electric machine in a first operational range;
a second electric machine configured to minimize electromagnetic losses of the second electric machine in a second operational range, wherein the second operational range is different from the first operational range;
a shaft comprising a singular pinion rotationally fixed to the shaft between a first end of the shaft and a second end of the shaft opposite the first end, wherein the first electric machine is coupled to the first end of the shaft, and the second electric machine is coupled to the second end of the shaft, and wherein the shaft is supported on exactly two bearing units; and
a spur gear unit comprising at least one spur gear stage and a differential gear unit, the at least one spur gear stage being drivingly coupled to the differential gear unit,
wherein the singular pinion engages with a gear of the spur gear unit, and
wherein the differential gear unit comprises a first output flange for drivingly coupling a first wheel to the axle assembly and a second output flange for drivingly coupling a second wheel to the axle assembly,
wherein the differential gear unit is arranged centrally with respect to a vehicle width direction.

13. The vehicle of claim 12, wherein the differential gear unit is supported on exactly two bearing units.

14. The vehicle of claim 12, wherein the at least one spur gear stage comprises an intermediate shaft being arranged parallel to the shaft.

15. The vehicle of claim 14, wherein the intermediate shaft is supported on exactly two bearing units.

16. A method for operating an axle assembly, comprising:
operating only one out of a first electric machine of the axle assembly and a second electric machine of the axle assembly in a first driving mode, wherein the first electric machine is coupled to a first end of a shaft comprising a singular pinion rotationally fixed to the shaft between the first end of the shaft and a second end of the shaft opposite the first end, wherein the second electric machine is coupled to the second end of the shaft, wherein the first electric machine is configured to minimize electromagnetic losses of the first electric machine in a first operational range, wherein the second electric machine is configured to minimize electromagnetic losses of the second electric machine in a second operational range, wherein the second operational range is different from the first operational range, and wherein the shaft is supported on exactly two bearing units; and
operating both the first electric machine and the second electric machine in a second driving mode,
wherein the axle assembly further comprises a spur gear unit comprising at least one spur gear stage and a differential gear unit, the at least one spur gear stage being drivingly coupled to the differential gear unit,
wherein the singular pinion engages with a gear of the spur gear unit, and
wherein the differential gear unit comprises a first output flange for drivingly coupling a first wheel to the axle assembly and a second output flange for drivingly coupling a second wheel to the axle assembly.

17. The method of claim 16, wherein the first electric machine and the second electric machine are different types of machines.

18. The method of claim 17, wherein one out of the first electric machine or the second electric machine is an induction machine, a synchronous reluctance machine, a permanent magnet-assisted synchronous reluctance machine, a switched reluctance machine, or an electrically excited rotor synchronous machine, and
wherein a respective other one of the first electric machine or the second electric machine is a permanent magnet synchronous machine, an induction machine, a synchronous reluctance machine, a permanent magnet-assisted synchronous reluctance machine, a switched reluctance machine, an electrically excited rotor synchronous machine, a transverse flux machine, or a variable flux machine.

19. The method of claim 16, wherein the differential gear unit is supported on exactly two bearing units.

20. The method of claim 16, wherein the differential gear unit is rotatable around an axis of rotation being arranged parallel to the shaft.

* * * * *